United States Patent [19]
Baugh

[11] Patent Number: 5,934,832
[45] Date of Patent: Aug. 10, 1999

[54] PIPELINE RECOVERY APPARATUS

[76] Inventor: Benton F. Baugh, 14626 Oak Bend, Houston, Tex. 77079-6441

[21] Appl. No.: 08/896,982

[22] Filed: Jul. 18, 1997

[51] Int. Cl.$^6$ .................................................. F16L 1/04
[52] U.S. Cl. ........................... 405/173; 405/158; 405/170
[58] Field of Search ..................................... 403/170, 173, 403/188, 171, 169, 172, 158

[56] References Cited

U.S. PATENT DOCUMENTS

| 3,785,160 | 1/1974 | Banjavich et al. ........................ 405/170 |
| 4,332,510 | 6/1982 | Ferrentino ........................... 405/173 X |
| 4,445,804 | 5/1984 | Abdallah et al. ........................ 405/173 |

OTHER PUBLICATIONS

Deepwater Pipeline Recovery by David M. McStravick and Benton F. Baugh, a paper presented at Energy Week Conference & Exhibition, Jank. 28–30, Jan. 28, 1997.

*Primary Examiner*—Dennis L. Taylor

[57] ABSTRACT

A pipeline recovery apparatus which automatically locks onto the exterior surface of a remote and/or subsea pipeline by allowing contact of interlocking pivoted bowl half sections in a downwardly depending position to rotate the bowl sections to an engaging position between the pivot points and then locking the bowl sections into that locked position.

16 Claims, 3 Drawing Sheets

5,934,832

PIPELINE RECOVERY APPARATUS

BACKGROUND OF THE INVENTION

The field of invention is devices which will allow for the engagement and recovery of pipelines which are laid on the ocean floor and need to be recovered to the surface.

A particular difficulty has been seen in the ability to recover damaged or leaking pipelines in deepwater due to the difficulty of gripping the pipeline once it has been cut for recovery. Difficulty in accessing the end of a cut pipeline and limited visibility have suggested the advantages of having a device which could simply be dropped onto the pipeline from the side to automatically latch onto the pipe.

Devices have existed in diver depths of water which allow the manual make-up of bolts utilizing the dexterity of the divers. As the search for oil and gas has gone into progressively deeper water, a need was seen for strong clamping devices which operate automatically or by remote control.

SUMMARY OF THE INVENTION

The object of this invention is to provide a device which can be lowered onto a subsea pipeline and engage the pipeline to allow a substantial axial pull on the pipeline to recover the end of it to the surface.

A second object of the present invention is to have the engagement of the pipeline by the pipeline clamp apparatus being automatic to allow it to occur simply and without substantial intelligent intervention.

A third object of the present invention is provide for the actuation of the device even in the circumstance that the automatic mechanisms do not function.

Another object of the present invention is to provide for remote release of the device from the pipeline in case of emergency or completion of the required tasks.

Another object of the invention is to provide alternating clearances that allow for operation of the device on the one hand and effectively full circle contact and support on the other hand.

DESCRIPTION OF THE PREFERRED EMBODIMENT

Figure 1:
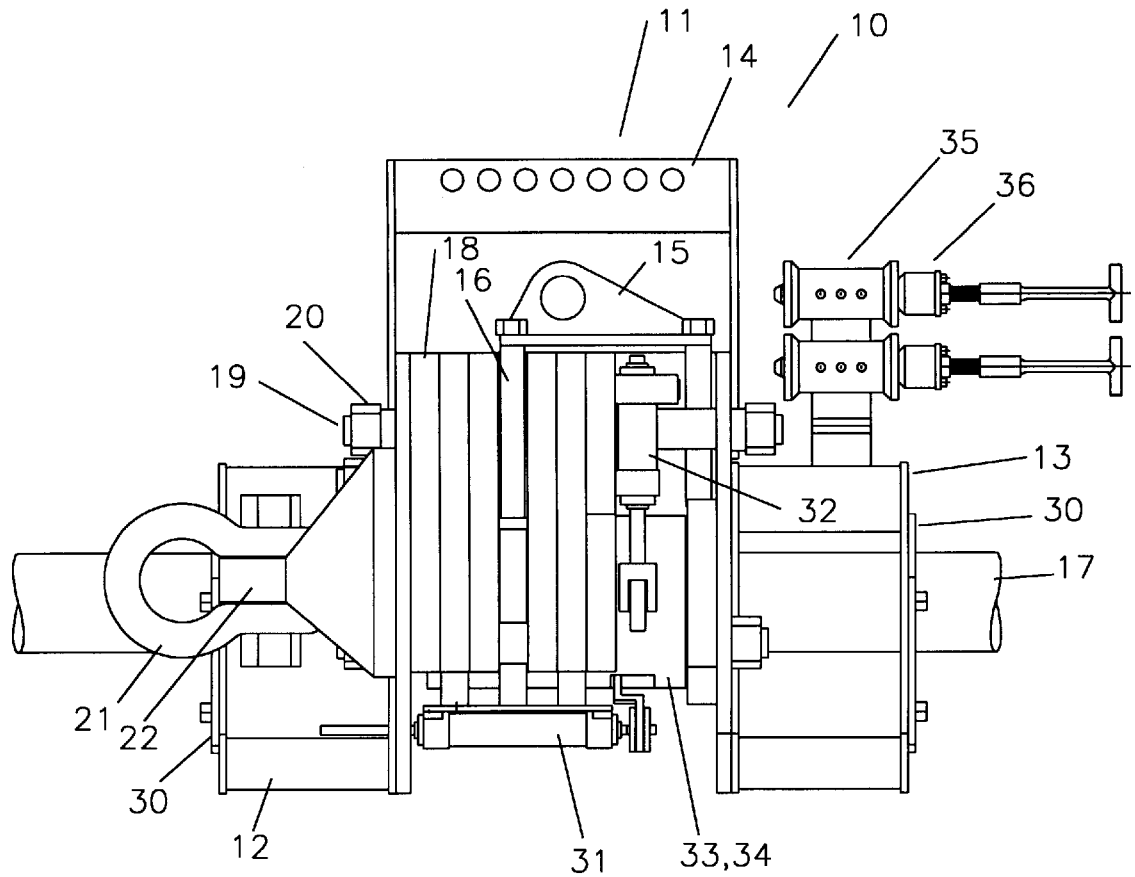
FIG. 1 is an external view of the apparatus of this invention from the side.

Referring now to FIG. 1, the pipeline recovery apparatus 10 has a main section 11, a front guide 12, a rear guide 13, a deployment handle 14, a release handle 15 which supports locking key 16, and a pipeline 17. The construction shown is of several frame plates 18 bolted together by bolts 19 and nuts 20. Cables (not shown) can be attached to shackles 21 which are in turn attached to main padeyes 22 on the front end of the pipeline recovery apparatus 10 to pull the pipeline to the surface for repair after engagement.

Pipe size plates 30 are bolted onto each end of the unit to reduce the opening in the front and rear guides to match the particular pipeline 17 being engaged. Cylinder 31 will assist in making sure slip sections engage the pipeline 17. Cylinders 32 will be used to make sure that the bowl members 33 and 34 are correctly positioned around the pipe, or are properly released when appropriate. ROV (remotely operated vehicle) stab receptacles 35 will allow for hydraulic control of cylinders 31 and 32 when desired. The figure illustrates dummy stabs 36 or protectors engaged in the stab receptacles 35. As is well known in the art, an ROV (not shown) will remove the dummy stab 36 with one of its manipulators and install a ported stab to deliver hydraulic power to the appropriate cylinders.

Figure 2:
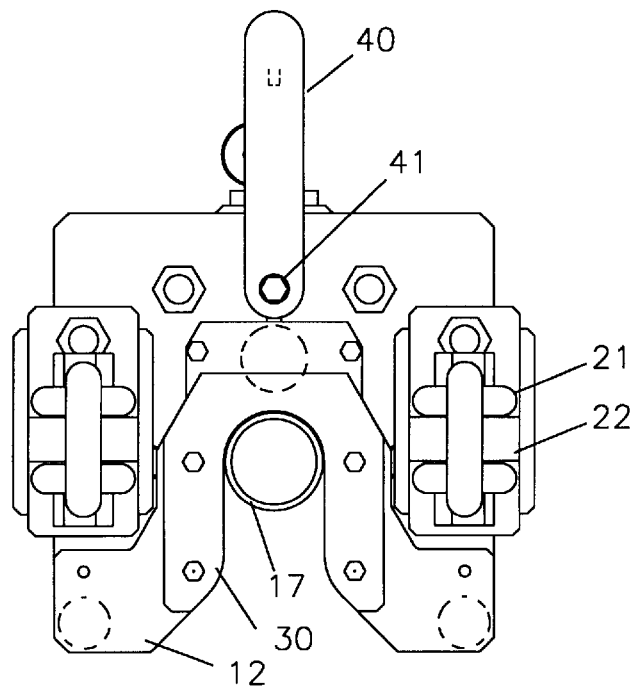
FIG. 2 is an end view of the apparatus of this invention, looking at it from the front end.

FIG. 2 shows the deployment handle 40 about pivot axle 41, main padeyes 21 for attachment of cables (not shown) for the recovery of the pipeline, pipeline 17 shown in front guide 12 with pipe size plate 30.

Figure 3:
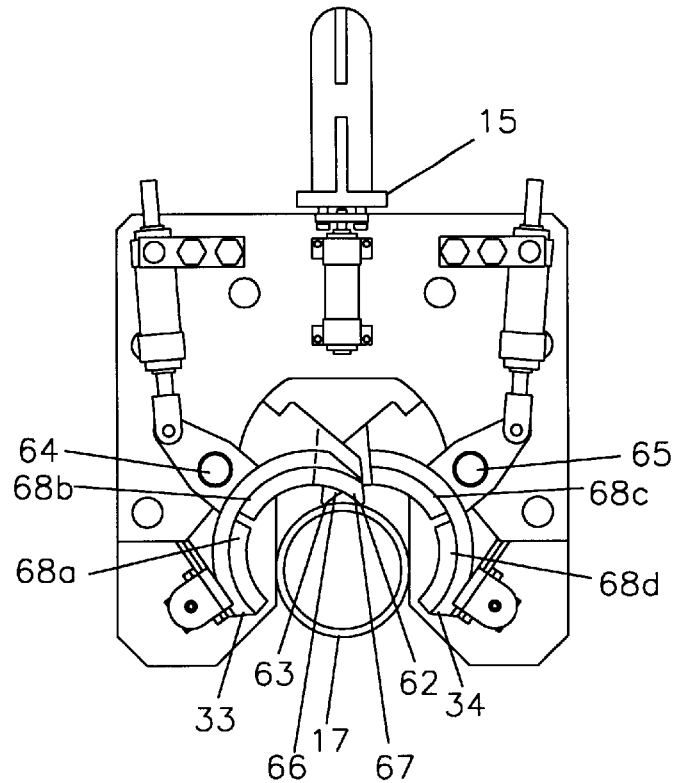
FIG. 3 is a section thru the apparatus showing the bowl section in the deployment position approaching the pipeline to be engaged.

FIG. 3 shows that the bowl sections 33 and 34 are downwardly facing, accepting the pipeline 17 within the central portion. Once the pipeline recovery apparatus moves down until the ends 62 and 63 of the bowl sections 33 and 34 engage the pipeline 17, further downward movement downward urges the bowl sections to rotate about axles 64 and 65. Four slip sections 68a, 68b, 68c, and 68d are located within the bowl sections 33 and 34.

This figure illustrates the potential interference between bowl sections 33 and 34 and the potential interference between slip sections 68b and 68c. The bowl sections 33 and 34 are pivoted downwardly about axles 64 and 65, causing areas 62 and 63 to have an overlap. Area 62 is an extended portion of bowl section 33 and area 63 is a notch into bowl section 34. Along the length of the bowl sections and slip sections parallel to the centerline of the pipeline 17, the extended portion and notches will alternate in a castellated form.

Figure 4:
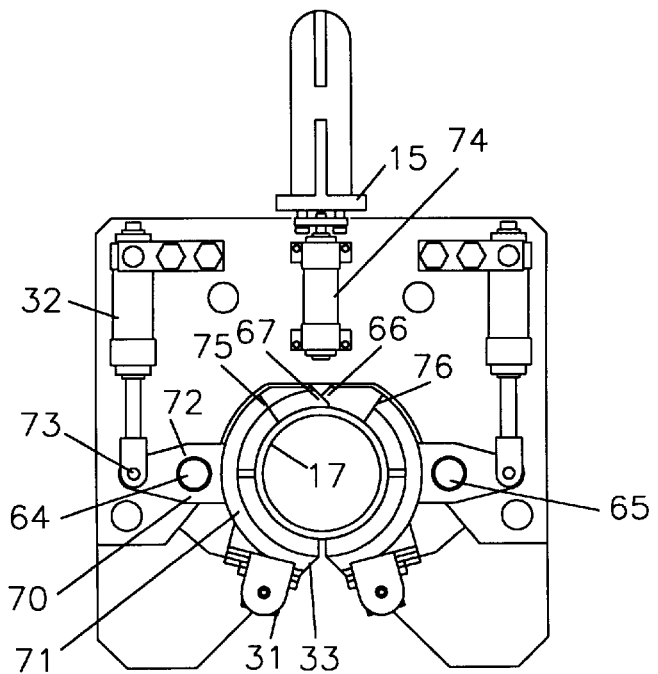
FIG. 4 is a section thru the apparatus with the pipeline fully engaged and with the centroid of the pipeline being approximately midway between the pivot axles on each side.

FIG. 4 illustrates the position of the bowl sections will assume when the pipeline is moved to a position directly between the axles 64 and 65.

Bowl section 33 has and ear 70 which extends outwardly from the main section 71 and which has a hole 72 around the axle 64, and an additional hole 73 which connects to the cylinder 32. Cylinder 32 can be used to make sure that the bowl section 33 fully engages the pipeline 17 when landing the pipeline recovery unit on the pipeline, or can assist in release of the pipeline recovery unit from the pipeline. Cylinder 74 can be used to lift the release handle 15 and therefore the locking key 16 upon the decision to release the pipeline recovery unit from the pipeline. Cylinders 31 will be used to insure that the slips set onto the pipeline, as will be discussed in later figures.

Areas 62 and 63 are shown as still overlapping in this figure with the bowl sections wrapped around the pipeline 17. Lines 75 and 76 indicate the clearance required for the movement of bowl sections 33 and 34 if not for the castellations of 66 and 67. If these clearances were provided in the bowl sections and slip sections, a substantial portion of the pipeline would not be properly supported during the recovery operations.

Figure 5:
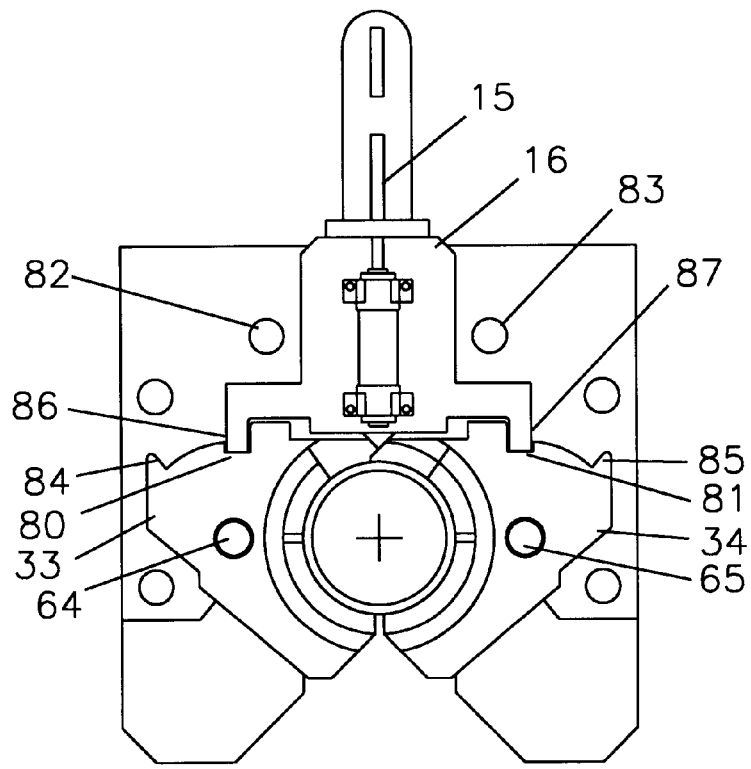
FIG. 5 is a view through the locking key that will release the grip on the pipeline if the key is pulled up.

FIG. 5 is an additional section thru the pipeline recovery apparatus that illustrates the locking key 16 engaging slots 80 and 81 in the bowl sections 33 and 34. When the bowl sections 33 and 34 achieve the balanced position between the axles 64 and 65, the locking key 16 drops into the slots 80 and 81 to secure the bowl sections 33 and 34 in place. Pulling up on release handle 15 pulls the locking key 16 out of slots 80 and 81 and causes the locking key 16 to hit bolts 82 and 83, picking up the entire pipeline recovery apparatus and removing it from the pipeline 17. When the locking key 16 is lifted to release the pipeline recovery apparatus from the pipeline, shoulders 84 and 85 of bowl sections 33 and 34 engage the shoulders 86 and 87 of locking key 16 to stop further downward rotation.

Figure 6:
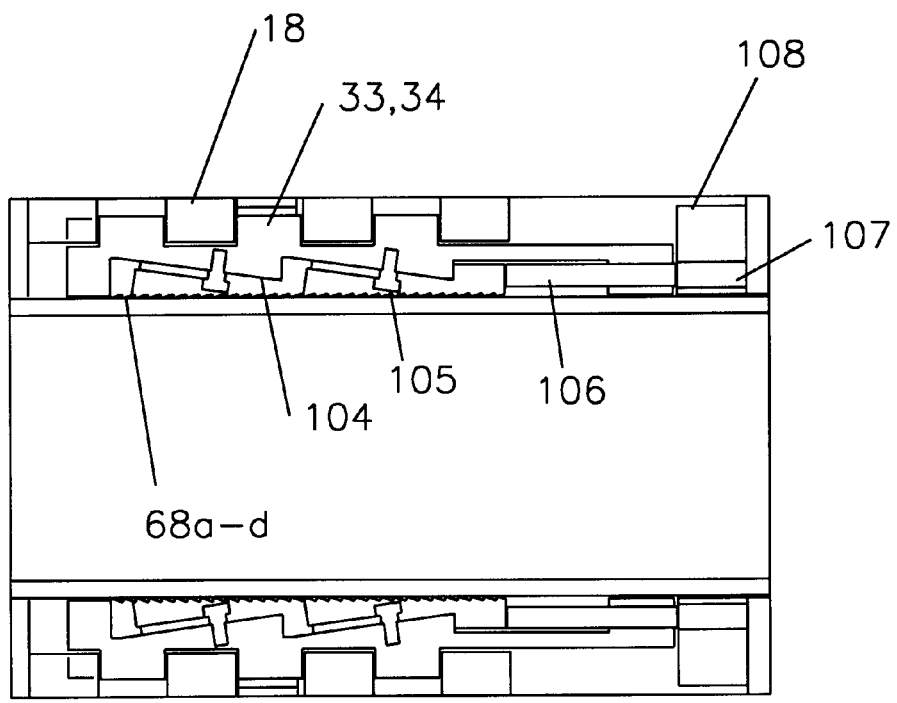
FIG. 6 is a partial section thru the slip and slip bowl area illustrating the internal mechanisms of the slips.

FIG. 6 shows the slip sections 68a, 68b, 68c, and 68d fitted within the bowl section 33 and 34 with an interface at a small taper 104 to the centerline of the pipeline, i.e. 8°. Once the bowl sections 33 and 34 are encompassing the pipeline 17, and the pipeline recovery apparatus is pulled to the left in the view, the slip sections 68a, 68b, 68c, and 68d will tend to remain stationary with respect to the pipeline 17, causing the bowl section 33 to attempt to ride up the taper 104, resulting in a radial load of the slip section 68a, 68b, 68c, and 68d on the pipeline 17. This radial load provides for friction to engage the pipeline and recovery it to the surface. After the slip sections 68a, 68b, 68c, and 68d are radially loaded onto the pipe, cables (not shown) will pull up on the main padeyes 21 to recover the pipeline recovery apparatus and therefore the end of the pipeline to the surface.

FIG. 6 additionally shows pin 106 which is butting against the rear end of slip sections 68a, 68b, 68c, and 68d and prevents the rightward movement of slip sections 68a, 68b, 68c, and 68d until the pin 106 is aligned with and engages the hole 107 in plate 108. This insures that the slip sections 68a, 68b, 68c, and 68d will not set until in the proper position for setting. This assurance of no premature setting can also be gained by the use of hydraulic cylinders 31. When hydraulic cylinders 31 are used for this purpose, they can also be used to make sure that the slip sections are properly set when setting is desired.

The foregoing disclosure and description of this invention are illustrative and explanatory thereof, and various changes in the size, shape, and materials as well as the details of the illustrated construction may be made without departing from the spirit of the invention.

I claim:

1. A pipeline recovery apparatus for remotely engaging the exterior of a subsea pipeline from the side and allowing recovery loading to be taken axially with respect to said subsea pipeline, comprising
    a main frame,
    a recess on the lower side of said frame,
    two pivot axis mounted on said frame displaced on each side of said recess and defining a plane,
    two bowls, one mounted about each of said pivot axis and each having a cylindrical gripper for contacting the exterior surface of said subsea pipeline, said cylindrical grippers having a cylindrical gripping faces,
        said cylindrical gripping faces having an upper edge and a lower edge,
        said cylindrical grippers having a first position with the centroid of said cylindrical gripping faces being approximately coplanar with the center of said pivot axis such that the gripping can occur between said pivot axis such that gripping forces will be reacted directly into said frame,
        said bowls having a second position with the centroid of said cylindrical gripping faces being pivoted to a position below the plane of the pivot axis such that said lower edges of said gripping faces are spaced apart to a distance greater than the diameter of said subsea pipeline.

2. The invention of claim 1, wherein locking means are engaged when said bowls travel from said second position to said first position to retain said bowls in said first position.

3. The invention of claim 2, wherein release means are provided to release said locking means to allow said bowls to travel from said first position to said second position and release said pipeline recovery apparatus from said pipeline.

4. The invention of claim 1 wherein grip preventing means are provided such that said cylindrical gripper cannot grip the outer surface of said pipeline until said bowl is pivoted to said first position.

5. The invention of claim 4 wherein said grip preventing means is a pin engaging said cylindrical gripper that engages a hole when said bowl member is moved to said first position to allow said pin to move into said hole and said cylindrical gripper to move to a position engaging said pipeline.

6. The invention of claim 4 wherein said grip preventing means is a cylinder which can be urged by fluid pressure to prevent the setting of said cylindrical grippers until it is desired that said cylindrical grippers be set and will force said cylindrical grippers into a setting position when it is desired that said cylindrical grippers be in a setting position.

7. The invention of claim 1, wherein said two bowls have alternating clearances and projections allowing said bowls to move to a downwardly deployed second position but that proximate full circumference contact can be maintained when in said first position.

8. The invention of claim 1, wherein cylinders are provided between said frame and said bowls to assist in the movement of said bowls alternately between said first position and said second position.

9. A pipeline recovery apparatus for remotely gripping the exterior of a pipeline, comprising
    a frame with two pivot axis, said pivot axis defining a plane,
    two bowls in a first position with gripping faces facing downwardly to approach a pipeline,
    after contact with said pipeline further downward travel of said frame relative to said pipeline rotates said bowls with said gripping faces to an opposing position with the centerline of said pipeline proximately coplanar with said two pivot axis to allow gripping of said pipeline such that gripping forces will be reacted directly into said frame.

10. The invention of claim 9, wherein locking means are engaged when said bowl s travels from said first position to said second position to retain said bowl s in said second opposing position.

11. The invention of claim 10, wherein release means are provided to release said locking means to allow said bowl s to travel from said second opposing position to said first position and release said pipeline recovery apparatus from said pipeline.

12. The invention of claim 1 wherein grip preventing means are provided such that said gripping means cannot grip the outer surface of said pipeline until said bowl is pivoted to said second position.

13. The invention of claim 12 wherein said grip preventing means is a pin engaging said gripping means that engages a hole when said bowl member is moved to said first position to allow said gripping means to move to a position engaging said pipeline.

14. The invention of claim 12 wherein said grip preventing means is cylinder means which can be urged by fluid pressure to prevent the setting of the gripping means until it is desired that the gripping means be set and will force the gripping means into a setting position when it is desired that the gripping means be in a setting position.

15. The invention of claim 9, wherein said two bowls have alternating clearances and projections allowing said bowls to move to a downwardly deployed second position.

16. The invention of claim 15, wherein said gripping faces of said bowl provide near continuous support for said pipeline around the circumference.

* * * * *